(12) United States Patent
Fleischer

(10) Patent No.: US 8,480,463 B2
(45) Date of Patent: Jul. 9, 2013

(54) FLAT ELEMENT FOR THERMALLY ADJUSTING INDOOR AIR

(75) Inventor: Werner Fleischer, Schwarzenberg (CH)

(73) Assignee: LK Luftqualität AG, Littau (CH)

( * ) Notice: Subject to any disclaimer, the term of this patent is extended or adjusted under 35 U.S.C. 154(b) by 1514 days.

(21) Appl. No.: 11/791,656

(22) PCT Filed: Nov. 25, 2005

(86) PCT No.: PCT/CH2005/000698
§ 371 (c)(1),
(2), (4) Date: Mar. 17, 2008

(87) PCT Pub. No.: WO2006/056095
PCT Pub. Date: Jun. 1, 2006

(65) Prior Publication Data
US 2008/0242217 A1    Oct. 2, 2008

(30) Foreign Application Priority Data

Nov. 26, 2004    (CH) ....................................... 1950/04

(51) Int. Cl.
*F24F 7/00*    (2006.01)
*F25B 29/00*    (2006.01)
*F28F 3/12*    (2006.01)
*F28F 3/14*    (2006.01)

(52) U.S. Cl.
USPC ............. 454/296; 454/292; 454/248; 165/63; 165/169; 165/170

(58) Field of Classification Search
USPC .................... 454/248, 292, 296; 165/63, 169, 165/170
See application file for complete search history.

(56) References Cited

U.S. PATENT DOCUMENTS

| | | | | |
|---|---|---|---|---|
| 2,796,230 A * | 6/1957 | Grove et al. | ................... | 251/172 |
| 3,743,826 A * | 7/1973 | Halfaker | ........................ | 362/149 |
| 4,399,485 A * | 8/1983 | Wright et al. | ................. | 361/693 |
| 4,720,207 A * | 1/1988 | Salani | ............................ | 404/90 |
| 5,038,754 A * | 8/1991 | Scala | ............................ | 126/521 |
| 5,411,438 A * | 5/1995 | White et al. | ................. | 454/300 |
| 5,807,171 A * | 9/1998 | Felsen | ........................... | 454/296 |
| 2002/0119747 A1* | 8/2002 | Tang | ............................. | 454/292 |
| 2003/0086813 A1* | 5/2003 | Fleischer | ......................... | 422/3 |

* cited by examiner

*Primary Examiner* — John K Fristoe, Jr.
*Assistant Examiner* — Kevin Barss
(74) *Attorney, Agent, or Firm* — Gudrun E. Huckett

(57) ABSTRACT

The invention relates to a flat element (1) for thermally adjusting indoor air, especially for cooling indoor air. Said flat element (1) comprises an air guiding chamber (2) and an active cover surface (3) having microholes (4). The air guiding chamber (2) has an upper side (5), a plurality of sidewalls (6a, 6b), at least one opening (7) for letting air in and at least one opening (8) for discharging air. The active cover surface (3) closes the air guiding chamber (2) towards its open bottom side. The upper side (5) of the air guiding chamber (2) is shaped so as to have at least one baffle (10) having at least one air guiding edge (11).

25 Claims, 11 Drawing Sheets

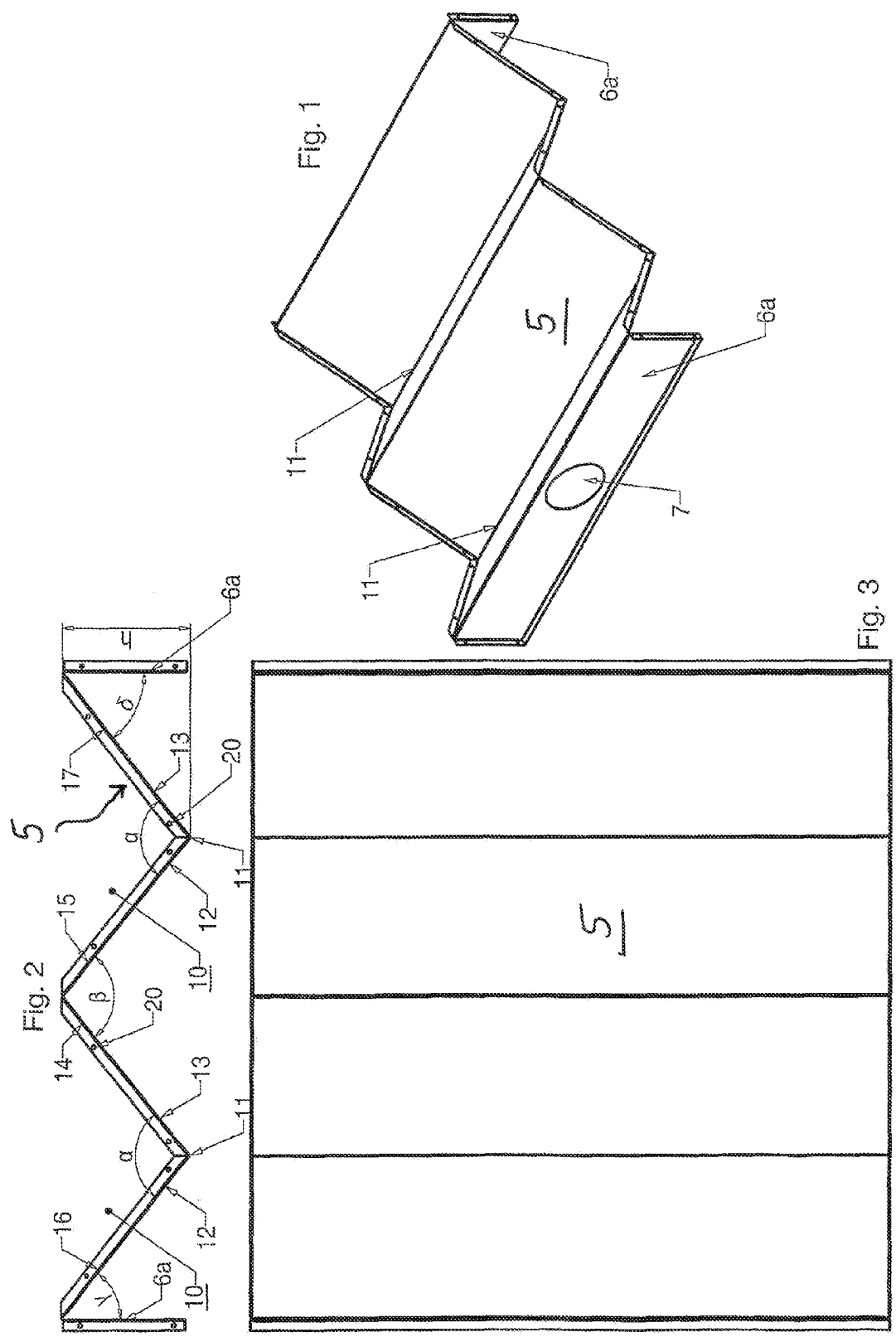

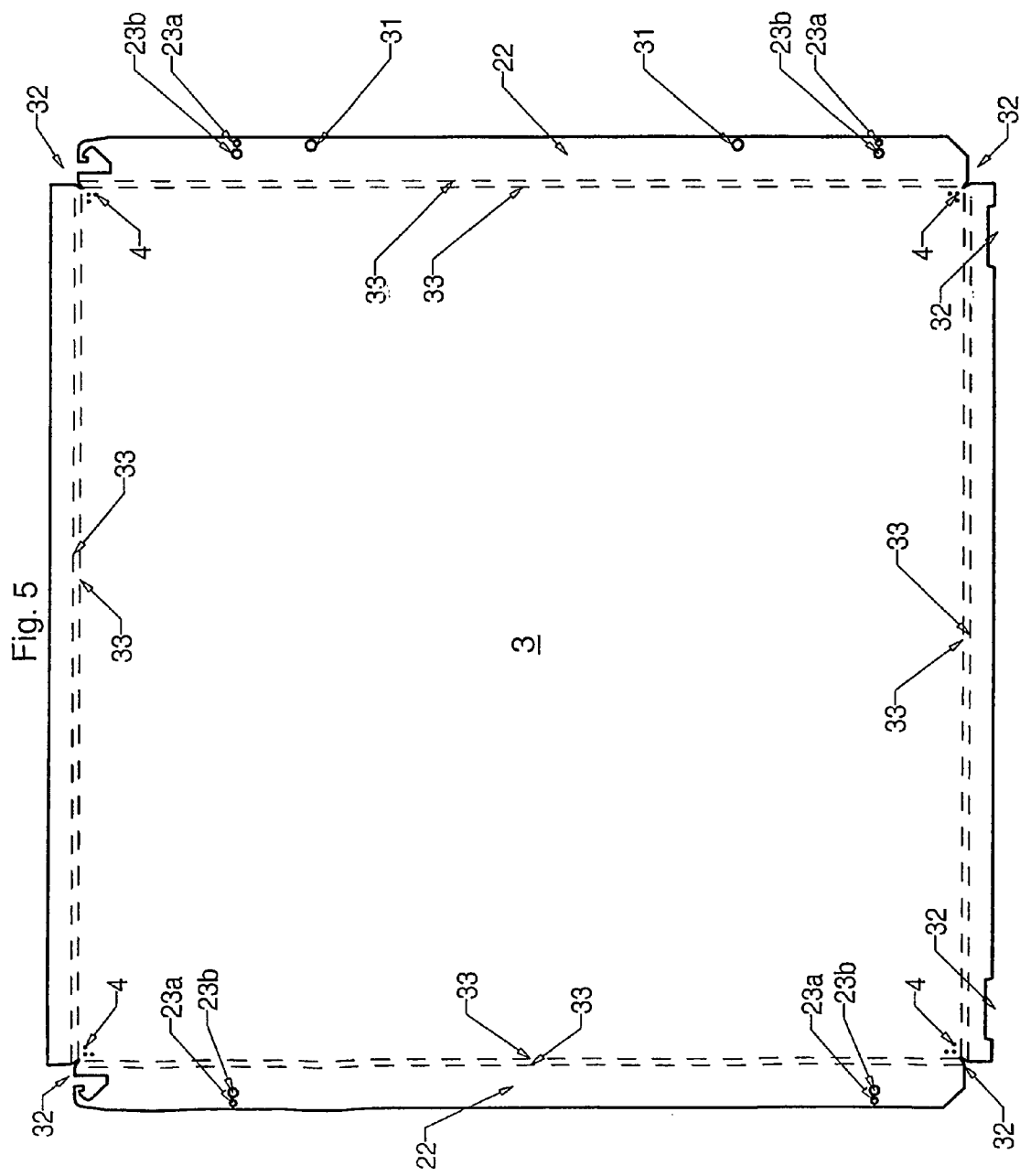

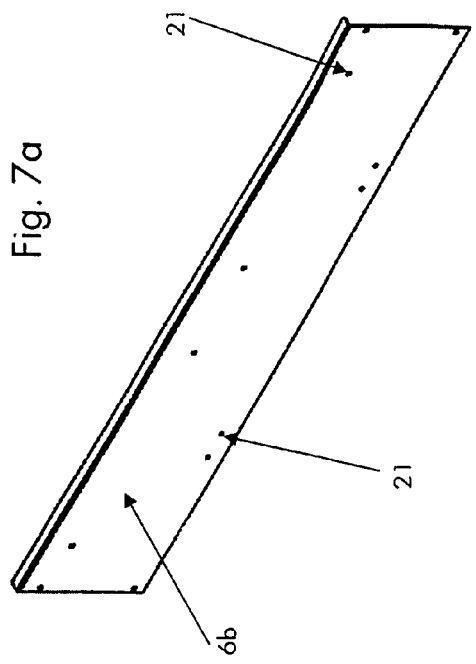
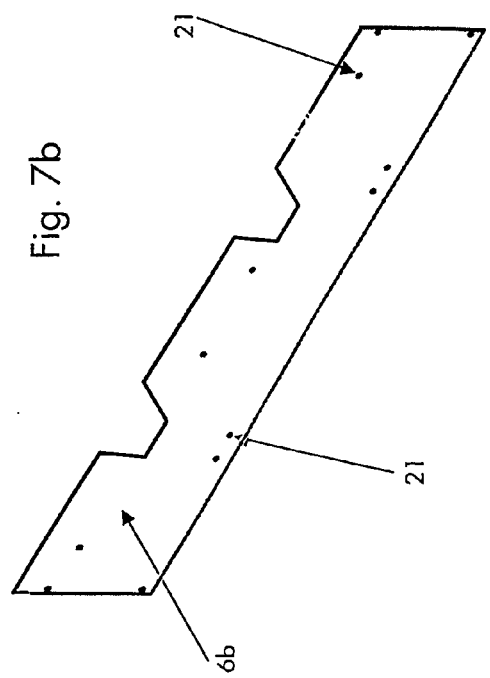
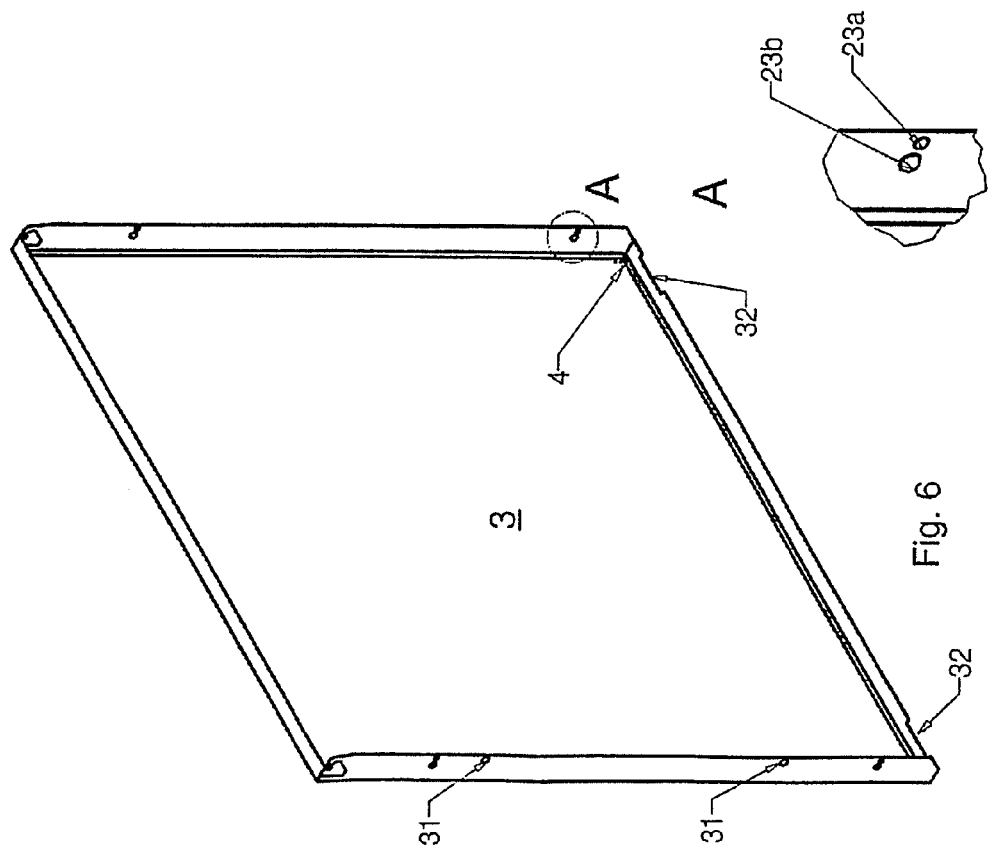

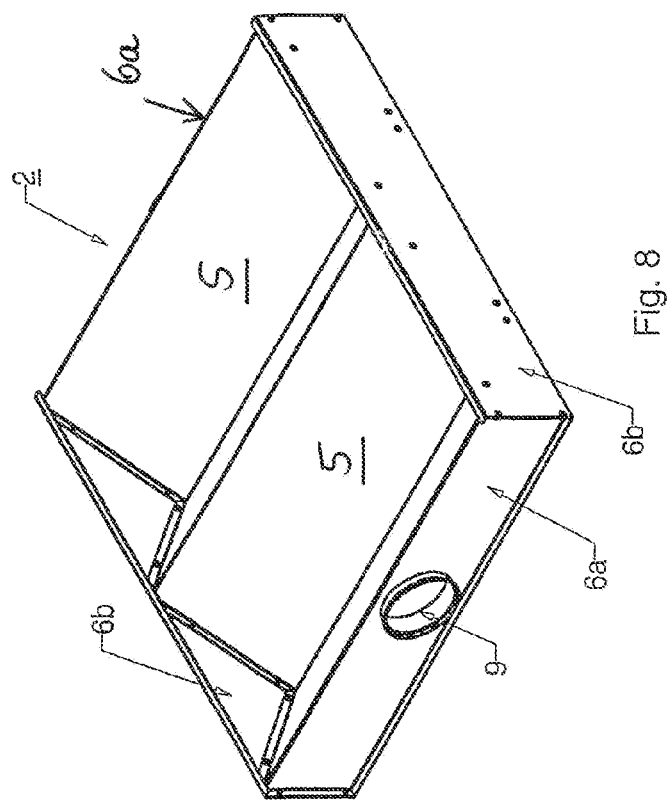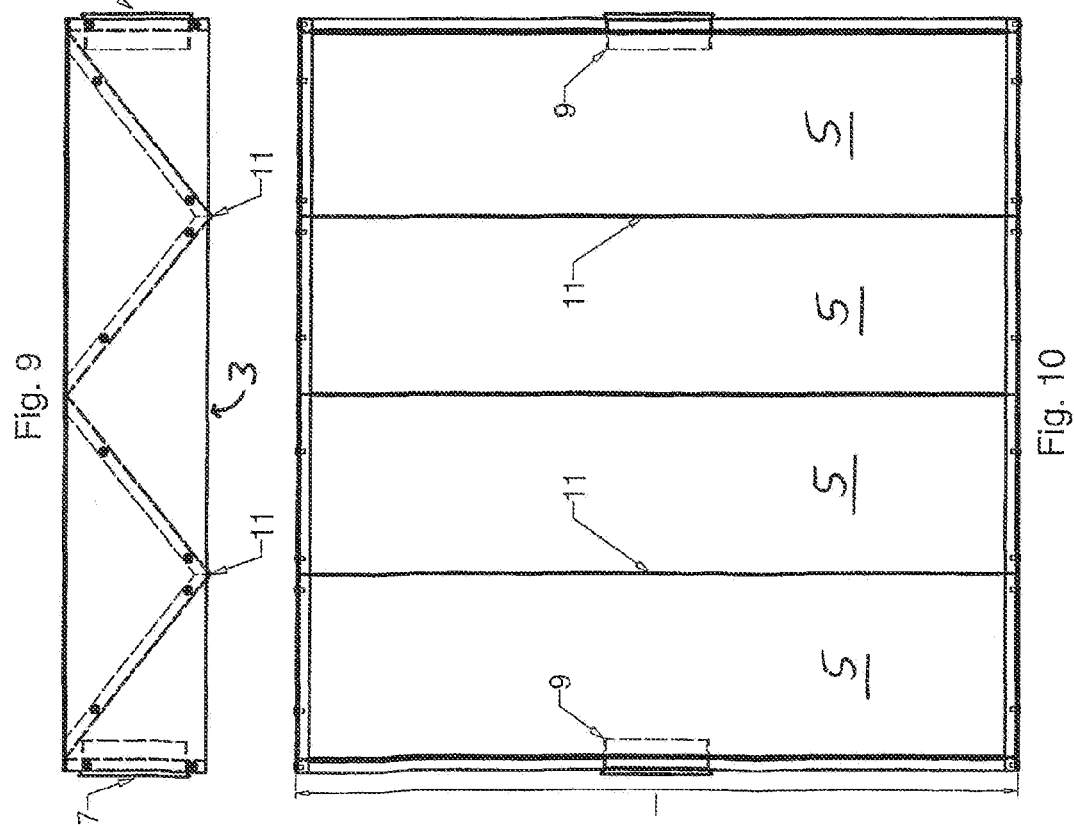

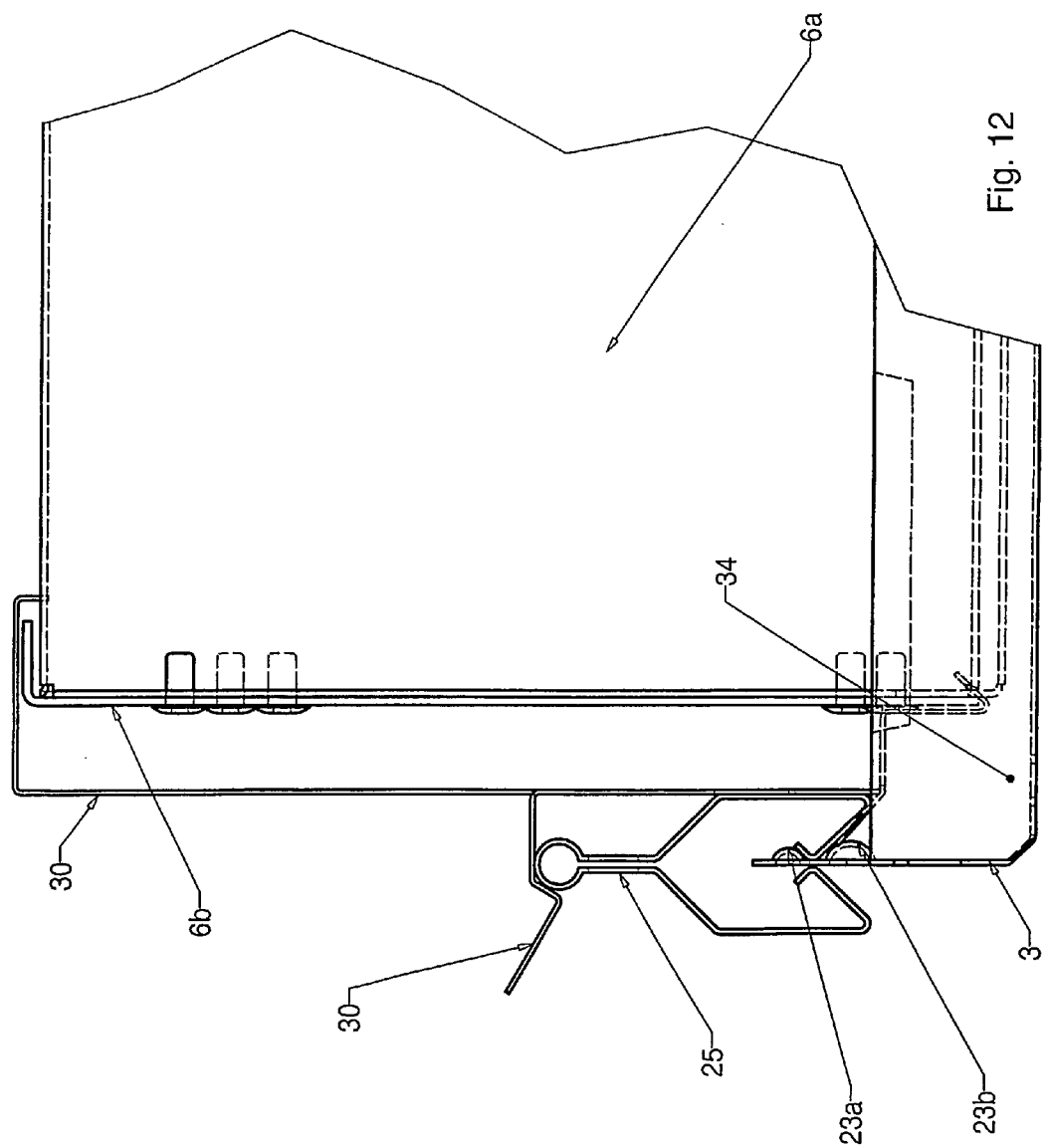

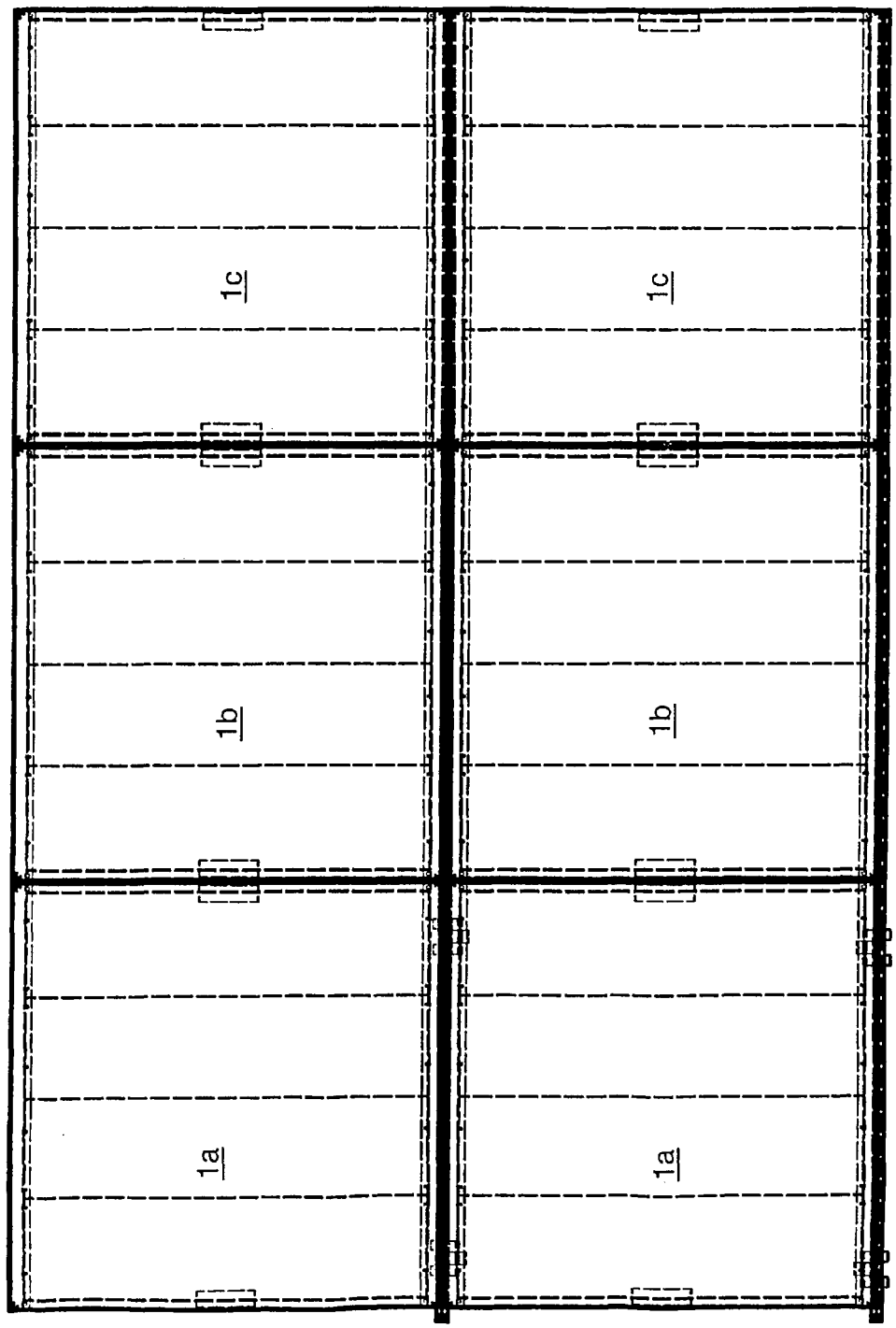
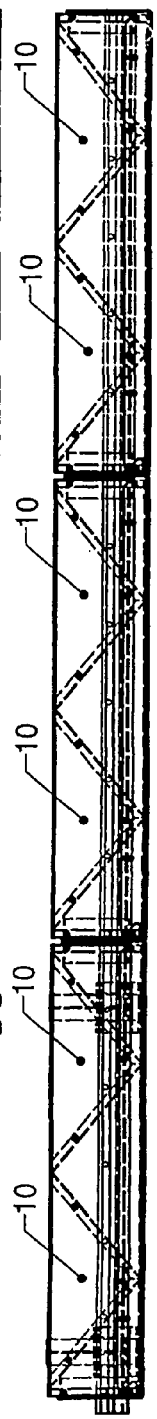

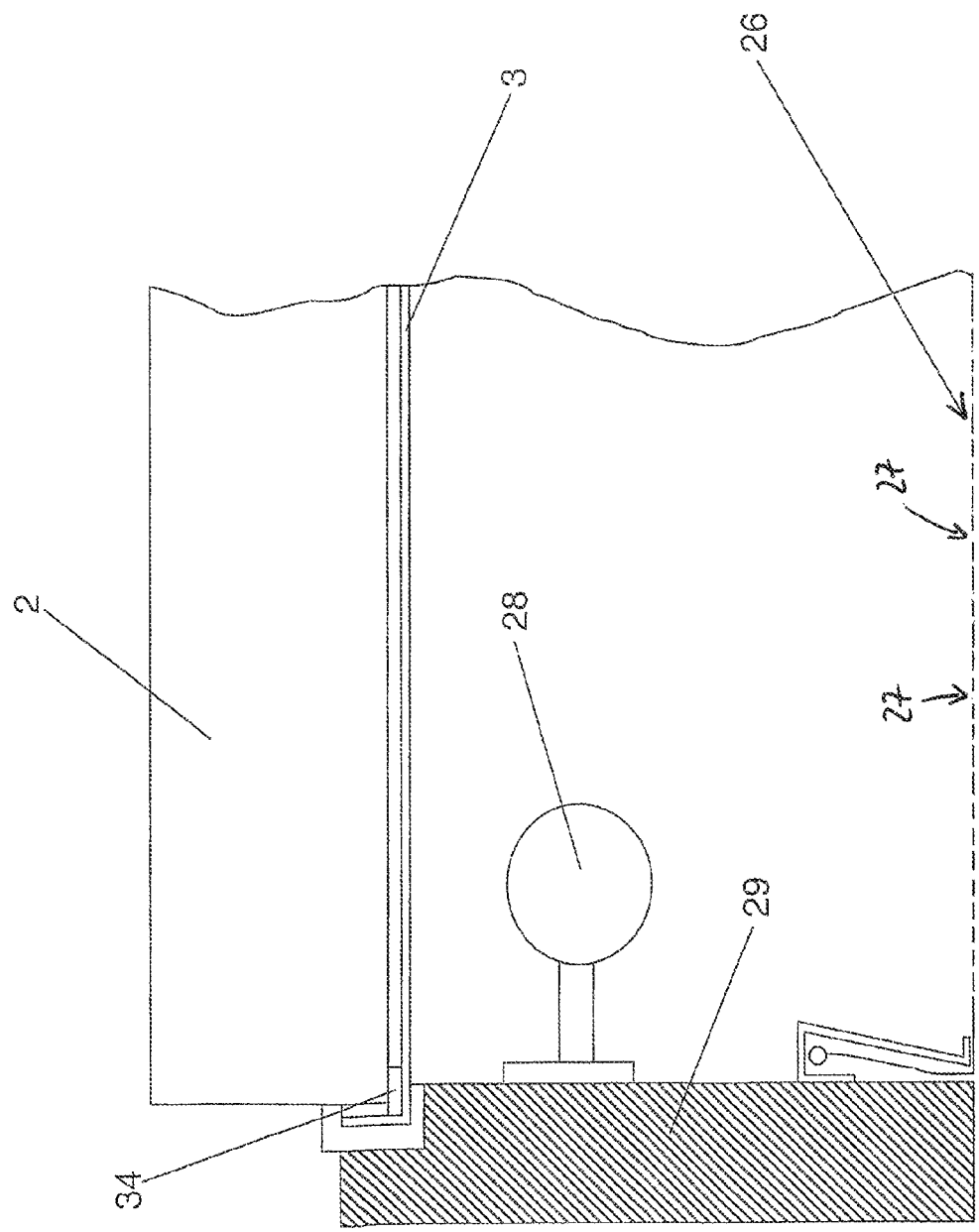

FLAT ELEMENT FOR THERMALLY ADJUSTING INDOOR AIR

FIELD OF THE INVENTION

The present invention is directed to a flat element for thermal adjustment of indoor air and to a device for thermal adjustment of indoor air.

BACKGROUND OF THE INVENTION

The thermal adjustment of indoor air may be realized by means of air convection. Thereby exist the most various elements for the outlet of air, for example twist outlets that are mounted on a ceiling.

A further alternative for the thermal adjustment of indoor air consists in the utilization of ceiling areas that are cooled with water. Due to the possibility of the condensation of water vapor on these with water cooled surfaces an aeration by means of windows aeration is excluded. This means that such with water cooled surfaces must be combined with a separate, central fresh air supply.

A further alternative for the thermal adjustment of indoor air comprises the thermal area adjustment by means of concrete core cooling. This kind of thermal adjustment of indoor air is very slow.

In EP 1 078 205 B1 are described air-cooling elements that have micro-holes in the cooling wall. These micro-holes have a diameter of not more than 0.8 mm. The free cross-section in this cooling wall is not more than 2%, referred to the total area of the cooling wall.

For the generation of turbulences in the fresh air must be present an antechamber. Such antechambers have economical and technical drawbacks. A technical drawback consists therein that into the antechamber must be mounted outlet ports or holes through which the fresh air must be blown onto the cooling wall.

This in turn means that directed air streams are generated. Thereby result cooling areas with different activities.

These air-cooling elements comprise a lot and constructive complex single components and are thus correspondingly expensive.

SUMMARY OF THE INVENTION

It is an object of the present invention to provide a flat element for thermal adjustment of indoor air, especially for cooling of indoor air, for example in the form of a ceiling element or in the form of a wall element.

With this flat element the fresh air shall be brought into a room spread over a relative capacious area in a comfortable and pleasant, especially draft-free, dynamic adaptable and essentially noiseless way.

This flat element shall be operated only by one single medium, namely air.

With this flat element shall be made possible simultaneously a uniform thermal adjustment of the area (use of the thermal radiation) and a supply of the room with the necessary amount of fresh air (use of the thermal convection).

With this flat element it shall be possible to produce an essentially laminar displacement air stream.

With this flat element the discharge effect of the preferably ionized supply air shall be minimized, that is, that this flat element shall not comprise parts that enhance the discharge effect excessively.

With this flat element the preferably ionized supply air shall act optimally in the room to be thermally adjusted.

It is a further object of the present invention to provide a flat element for thermal adjustment of indoor air, especially for cooling of indoor air, for example in the form of a ceiling element or in the form of a wall element, with which in special rooms with a highly required clean room characteristic particles may be pushed away from the technological caused active area.

It is a further object of the present invention to provide such a flat element with which the formation of a condensate of water vapor at the essential surfaces of this flat element may be avoided.

It is a further object of the present invention to provide such a flat element with which a high heat transport in the room to be thermally adjusted is possible.

This flat element shall comprise preferably only a few and constructive simple single parts.

This flat element shall require preferably only a small installation height in order that the effective height of the room may be used optimally.

With the present invention these objects are attained.

BRIEF DESCRIPTION OF THE DRAWINGS

FIG. 1 shows purely schematically transverse from the top toward a possible upper surface 5 of an air conduct chamber 2.

FIG. 2 shows a side view of the upper surface 5 of the air conduct chamber 2 as shown in FIG. 3 shows a top view on the upper surface 5 of the air conduct chamber 2 as shown in FIG. 1.

FIG. 5 shows purely schematically the unrolling of the active ceiling area 3 with micro-holes 4 made of one piece. In this Figure the interrupted lines mean edges downwards. The micro-holes 4 are shown only suggestively in all four corners.

FIG. 6 shows purely schematically a perspective view of the inner side of the active ceiling area 3 which unrolling is shown in FIG. 5.

FIG. 7a shows purely schematically transverse from the top toward a possible side wall 6b for an air conduct chamber 2.

FIG. 7b shows purely schematically transverse from the top toward a possible side wall 6b with cut-outs for an air conduct chamber 2.

FIG. 8 shows purely schematically transverse from the top toward a possible air conduct chamber 2 with mounted side walls 6b and connecting pieces 9 in the form of pipes.

FIG. 9 shows a side view of the air conduct chamber 2 as shown in FIG. 8.

FIG. 10 shows a top view on the air conduct chamber 2 as shown in FIG. 8.

FIG. 12 shows the cross section through a suitable ceiling grid profile 25 to which are mounted a bracket 30, an air conduct chamber 2 and an active ceiling area 3.

FIG. 13 shows a top view on a possible device for thermal adjustment of indoor air. This device comprises two columns of each three flat elements 1a, 1b, 1c.

FIG. 14 shows a side view of the device for thermal adjustment of indoor air as shown in FIG. 13.

FIG. 17 shows purely schematically a possible manner of an alignment of a separately hung up foil 26 and of a light source 28.

DETAILED DESCRIPTION OF THE PREFERRED EMBODIMENTS

Figure 4:
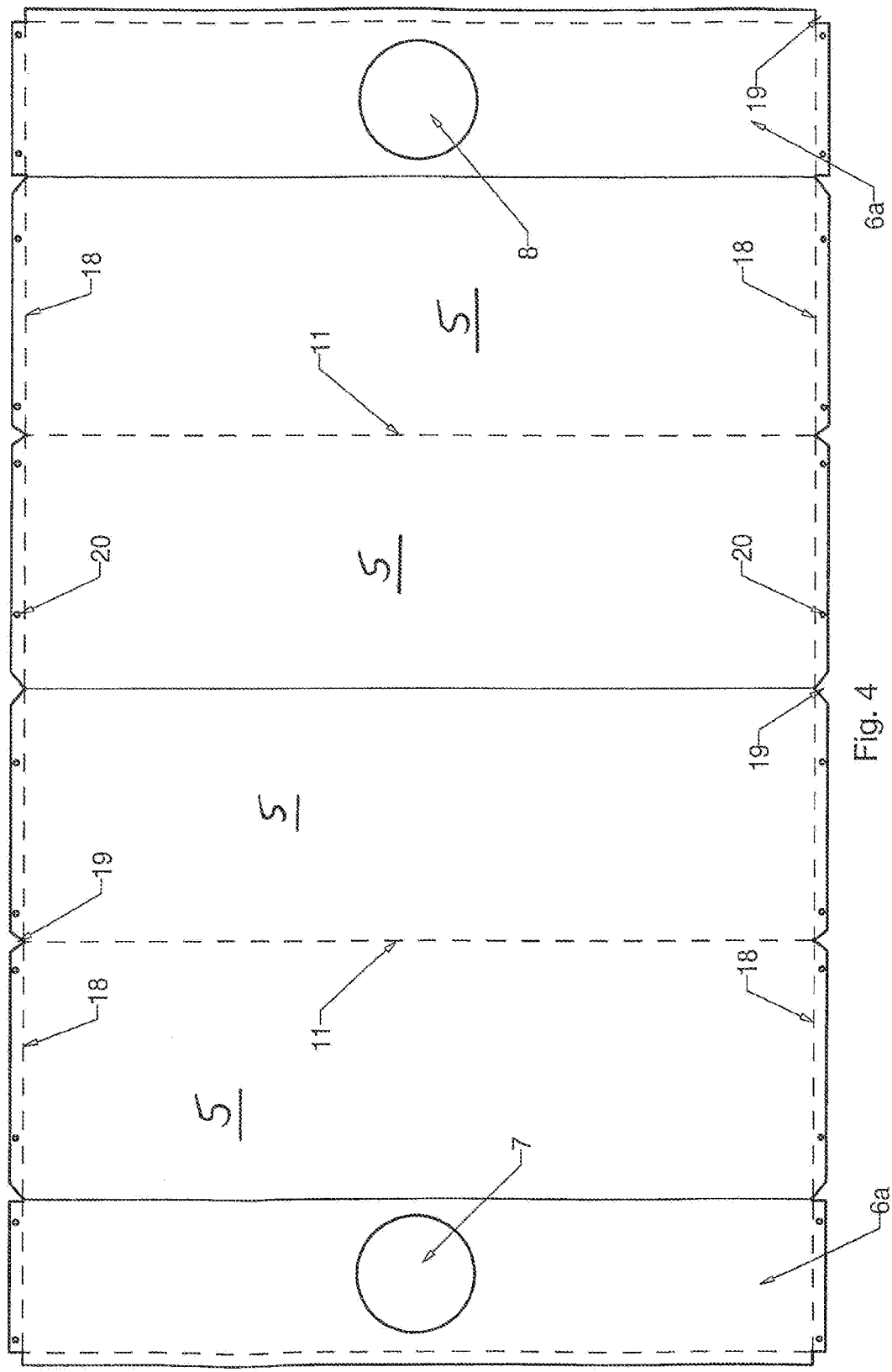
FIG. 4 shows purely schematically the unrolling of the upper surface 5 of the air conduct chamber 2 made of one piece, as shown in FIG. 1. In this Figure the interrupted lines mean edges downwards, and the drawn through lines mean edges upwards.
Figure 11D:
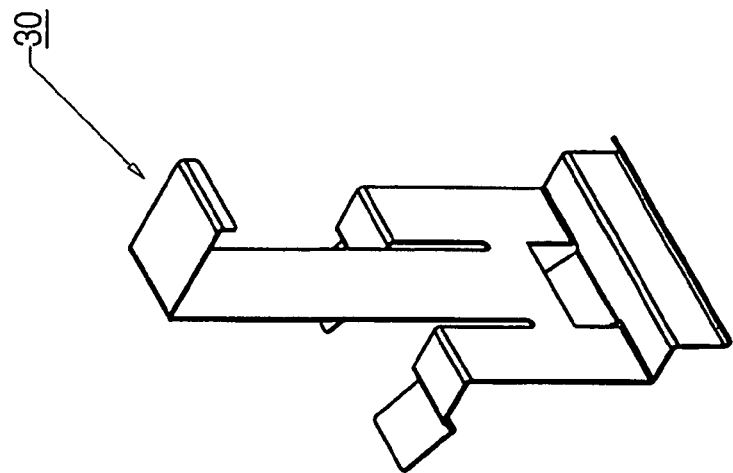
FIGS. 11a to 11d show various views of a suitable bracket 30 for the hanging of an air conduct chamber 2.
Figure 11C:
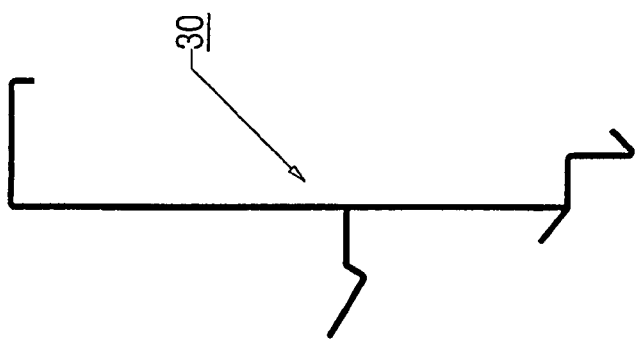
Figure 11A:
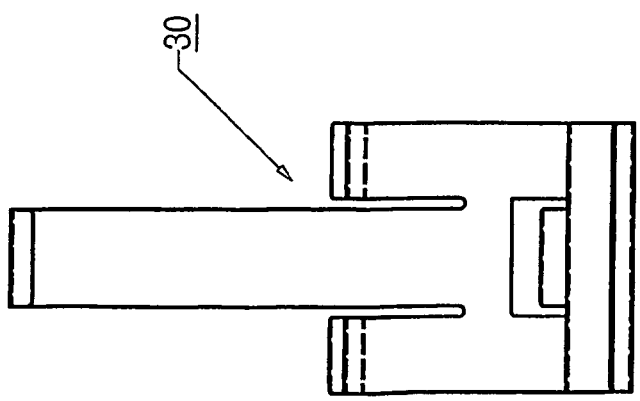
Figure 11B:
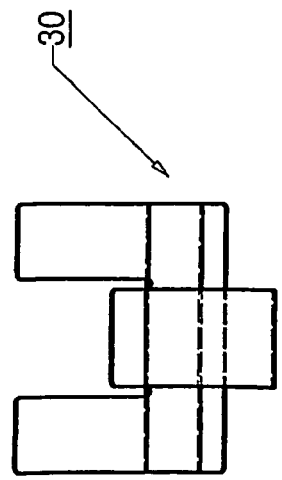

The inventive flat element 1—also named room element—for thermal adjustment of indoor air, especially for cooling of indoor air, for example in the form of a ceiling element or in the form of a wall element, whereby the form of a ceiling element is preferred,
is characterized in that
it comprises an air conduct chamber 2 and an active ceiling area 3 with micro-holes 4, whereby
the air conduct chamber 2 has
an upper surface 5,
several side walls 6a, 6b,
at least one opening 7 for the inlet of air,
at least one opening 8 for the outlet of air,
whereby into each opening for the inlet of for the outlet of 7 for the inlet of air and into each opening 8 for the outlet of air is inserted a connecting piece 9 in the form of a pipe and is essentially hermetically sealed, and
whereby the air conduct chamber 2 is open on its bottom side, air,
the active ceiling area 3 terminates the air conduct chamber 2 on its open bottom side,
the air conduct chamber 2 and the active ceiling area 3 are essentially hermetically sealed with each other,
upper surface 5 of the air conduct chamber 2 is formed in such a way that it has at least one baffle 10 with at least one air conduct angle 11, whereby
this (these) baffle(s) 10 point(s) to the side of the active ceiling area 3, which is aligned to the inside of the flat element 1,
this (these) baffle(s) 10 generate(s) turbulences in an supplied air stream, and
this (these) baffle(s) 10 is (are) arranged crosswise to the connecting line between the opening(s) 7 for the inlet of air and the opening(s) 8 for the outlet of air, and
the opening(s) 7 for the inlet of air and the opening(s) S for the outlet of air are arranged in opposite side walls 6a.

The inventive device for thermal adjustment of indoor air, especially for cooling of indoor air, is characterized in that it comprises at least one column of inventive flat elements 1a,1b,1c, that are essentially hermetically sealed with each other.

The flat element comprises from two to ten baffles (10), especially two baffles (10), in the upper surface (5) of the air conduct chamber (2), and that the baffles (10) are shaped either sinuously or are cascaded, including any combinations thereof, whereby corresponding air conduct angles (11) are preferably chamfered, for example with a radius from 1 mm to 10 mm, preferably from 1 mm to 5 mm, especially of 3 mm.

In the flat element the sinuously shaped baffles (10) have independent from each other the same or different wave lengths $\lambda$ and with the same or different amplitudes A.

In the flat element, the cascaded shaped baffles (10) independent from each other are aligned symmetrically or asymmetrically and have either the same or different heights h and downs t, respectively.

The cross section through the respective present baffles (10) independent from each other has either the form of a triangle, especially the form of an isosceles triangle, or any polygonal form, including any combinations thereof.

In the case of a baffle (10) with a side length l of 600 mm the distance d between the lower end of the lowest air conduct angle (11) at this baffle (10) and the inward side of the active ceiling area (3) is from 1 mm to 25 mm, preferably from 1 mm to 20 mm, whereby in the presence of a plurality of baffles (10) the distance d is defined for each single baffle (10) individually.

The distanced between the lower end of an air conduct angle (11) of a baffle (10) and the inward side of the active ceiling area (3) is adjustable by means of a profile that is attachable, preferably adhesive or screwable, to the air conduct angle (11) and/or the baffle (10), whereby this profile is preferably round-shaped, for example with a radius from 1 mm to 10 mm, preferably from 1 mm to 5 mm, especially of 3 mm, and whereby in the presence of a plurality of baffles (10) the distance d is defined individually for each single baffle (10).

In the case of cascaded shaped baffles (10) having a triangular cross section the angle $\alpha$ between the lower part of the front side (12) and lower part of the back side (13) of a baffle (10) amounts from 72 degrees to 134 degrees, preferably from 95 degrees to 110 degrees, especially about 103 degrees, the angle $\beta$ between the upper part of the back side (14) of a first baffle (10) and the upper part of the front side (15) of a second baffle (10) amounts from 75 to 140 degrees, preferably from 100 degrees to 115 degrees, especially about 102 degrees, the angle $\gamma$ between the side wall (6a) with the opening(s) (7) for the inlet of the air and the upper part of the front side (16) of a first baffle (10) amounts from 38 degrees to 72 degrees, preferably from 50 degrees to 60 degrees, especially about 52 degrees, and that the angle $\delta$ between the side wall (6a) with the opening(s) (8) for the outlet of the air and the upper part of the back side (17) of the last baffle (10) amounts from 38 degrees to 72 degrees, preferably from 50 degrees to 60 degrees, especially about 52 degrees, whereby the angle $\gamma$ and the angle $\delta$ have preferably the same value.

The upper surface (5) of the air conduct chamber (2) is made of one piece, and has the following partial elements: at the longitudinal sides located edges (18) with free press cuts (19) and with holes (20), that serve for the mounting with further parts, a first front side (6a) with an edge, that serves for the stabilization, and with one to three symmetrically arranged opening(s) (7) for the inlet of air, preferably with one in the middle arranged opening (7) for the inlet of air, a second front side (6a) with an edge, that serves for the stabilization, and with one to three symmetrically arranged opening(s) (8) for the outlet of air, preferably with one in the middle arranged opening (8) for the outlet of air, and that in each opening (7) for the inlet of air and in each opening (8) for the outlet of air is inserted a connecting piece (9) in the form of a pipe and is essentially hermetically sealed, and five transverse, especially perpendicular, to the shortest connecting line between an opening (7) for the inlet and an opening (8) for the outlet of air arranged edges, along which the upper surface (5) of the air conduct chamber (2) is bent at the respective locations in an alternative way either downwards or upwards with the angles $\alpha$, $\beta$, $\gamma$, $\delta$ and thus form two baffles (10) having each a triangular cross section.

The upper surface (5) of the air conduct chamber (2) is connected with two side walls (6b) having holes (21) in an essentially hermetical way, for example with rivets ("Popnieten"), that are sided through the holes (20) in the lateral edges (18) and through the holes (21) in the side walls (6b), whereby said holes (20,21), are reconciled with each other, and whereby the side walls (6b) preferably have cut-outs, that are especially adapted to the edge guides of the present baffles (10).

On the outside of the upper surface (5) of the air conduct chamber (2) is applied an insulation material, for example a fire-proof polyurethane foam.

The air conduct chamber (2) is made of metal or of a metal alloy, for example of aluminum, zinc-plated steel plate, electrolytically zinc-plated steel plate, rustless steel plate, copper, brass.

The air conduct chamber (2) has a length from 40 cm to 160 cm, especially from 50 cm to 130 cm, preferably about 60 cm, a width from 40 cm to 80 cm, especially from 45 cm to 65 cm, preferably about 60 cm, and a height from 8 cm to 14 cm, especially from 10 cm to 14 cm, preferably about 12 cm.

The micro-holes (4) in the active ceiling area (3) are round and have a diameter from about 0.50 mm to about 1.20 mm, preferably from about 0.60 mm to about 1.00 mm, especially about 0.65 mm, and are present in a straight or staggered, regular or irregular in-line configuration.

The active ceiling area (3) is made of a metal plate, for example an electrolytically zinc-plated steel plate, and has a thickness from about 0.4 mm to about 1.5 mm, preferably from about 0.5 mm to about 0.8 mm, especially of about 0.6 mm.

The outward side, that is the visible side, of the active ceiling area (3) is left in an unprocessed state or that this side is surface-treated, for example for the purpose of colouring is powder-coated.

At least two opposite side walls (22) of the active ceiling area (3) have fixing parts and/or arrests (23), for example protruding embossings or neps.

The free cross-section in the active ceiling area (3) is from about 1% to about 4%, preferably at least about 2%, referred to the total area of the active ceiling area (3).

The essentially hermetical interconnection between the air conduct chamber (2) and the active ceiling area (3) is realized by means of a sealing material (34), for example with a weather strip, especially made of a self-adhesive cell-ca-outchouc.

In the device according to the invention, the connecting piece (9) in the form of a pipe, that is inserted in the opening (7) for the inlet of air in a first air conduct chamber (2), is connected with a conduct in which is feed in supply air, the connecting piece (9) in the form of a pipe, that is inserted in the opening (8) for the outlet of air in the first air conduct chamber (2), is connected with the connecting piece (9) in the form of a pipe, that is inserted in the opening (7) for the inlet of air in the second air conduct chamber (2), all further air conduct chambers (2) are connected with each other in analogy to the connection of the first air conduct chamber (2) with the second air conduct chamber (2), the connecting piece (9) in the form of a pipe, that is inserted in the opening (8) for the outlet of air in the last air conduct chamber (2) of said column, is closed with an end cap (24), and whereby all aforementioned connections are essentially hermetical.

In the device, the connection between the individual air conduct chambers (2) is realized by means of a muffle having in its middle a stopper and with lip-seals.

In the device, the column of flat elements (1a, 1b, 1c) comprises from two to eight, especially from two to six, preferably from four to six, flat elements (1a, 1b, 1c).

In the device, each air conduct chamber (2) and each active ceiling area (3) is affixed, especially is hung up, individually on at least two opposite rail-shaped ceiling grid profiles (25), whereby the ceiling grid profiles (25) are affixed on hanging supports in the ceiling substructure.

In the device, the outward sides, that are the visible sides, of the active ceiling areas (3) are covered with at least one separate hung up foil (26), for example made of a textile material or made of plastics, whereby this foil (26) has micro-holes (27), the free cross-section in this foil (26) is in comparison to the free cross-section in the active ceiling area (3) either the same or is bigger, and the micro-holes (27) in the foil (26) are round and have in comparison to the micro-holes (4) in the active ceiling area (3) either the same size or are bigger and are present in a straight or staggered, regular or irregular in-line configuration, and whereby the device for thermal adjustment of indoor air and the separately hung up foil (26) are essentially hermetically sealed with each other.

In the device, the ionized supply air is feed in.

In the device, between the outward sides, that are the visible sides, of the active ceiling area (3) and the separately hung up foil (26) is arranged at least one light source (28), that is preferably fixed at a lateral frame (29).

In the flat element, the sinuously shaped baffles (10) have independent from each other an alignment with the same wave lengths $\lambda$ and with the same or different amplitudes A.

In the flat element, the cascaded shaped baffles (10) independent from each other are aligned symmetrically with the same or different heights h and downs t, respectively.

Preferred embodiments of this invention are defined in the dependent claims.

In the following part are described possible embodiments of the present invention.

Thereby is made also reference to the figures.

FIG. 1 shows purely schematically transverse from the top toward a possible upper surface 5 of an air conduct chamber 2.

FIG. 2 shows a side view of the upper surface 5 of the air conduct chamber 2 as shown in FIG. 3 shows a top view on the upper surface 5 of the air conduct chamber 2 as shown in FIG. 1.

FIG. 4 shows purely schematically the unrolling of the upper surface 5 of the air conduct chamber 2 made of one piece, as shown in FIG. 1. In this Figure the interrupted lines mean edges downwards, and the drawn through lines mean edges upwards.

FIG. 5 shows purely schematically the unrolling of the active ceiling area 3 with micro-holes 4 made of one piece. In this Figure the interrupted lines mean edges downwards. The micro-holes 4 are shown only suggestively in all four corners.

FIG. 6 shows purely schematically a perspective view of the inner side of the active ceiling area 3 which unrolling is shown in FIG. 5.

FIG. 7a shows purely schematically transverse from the top toward a possible side wall 6b for an air conduct chamber 2.

FIG. 7b shows purely schematically transverse from the top toward a possible side wall 6b with cut-outs for an air conduct chamber 2.

FIG. 8 shows purely schematically transverse from the top toward a possible air conduct chamber 2 with mounted side walls 6b and connecting pieces 9 in the form of pipes.

FIG. 9 shows a side view of the air conduct chamber 2 as shown in FIG. 8.

FIG. 10 shows a top view on the air conduct chamber 2 as shown in FIG. 8.

FIGS. 11a to 11d show various views of a suitable bracket 30 for the hanging of an air conduct chamber 2.

FIG. 12 shows the cross section through a suitable ceiling grid profile 25 to which are mounted a bracket 30, an air conduct chamber 2 and an active ceiling area 3.

FIG. 13 shows a top view on a possible device for thermal adjustment of indoor air. This device comprises two columns of each three flat elements 1a, 1b, 1c.

FIG. 14 shows a side view of the device for thermal adjustment of indoor air as shown in FIG. 13.

Figure 15:
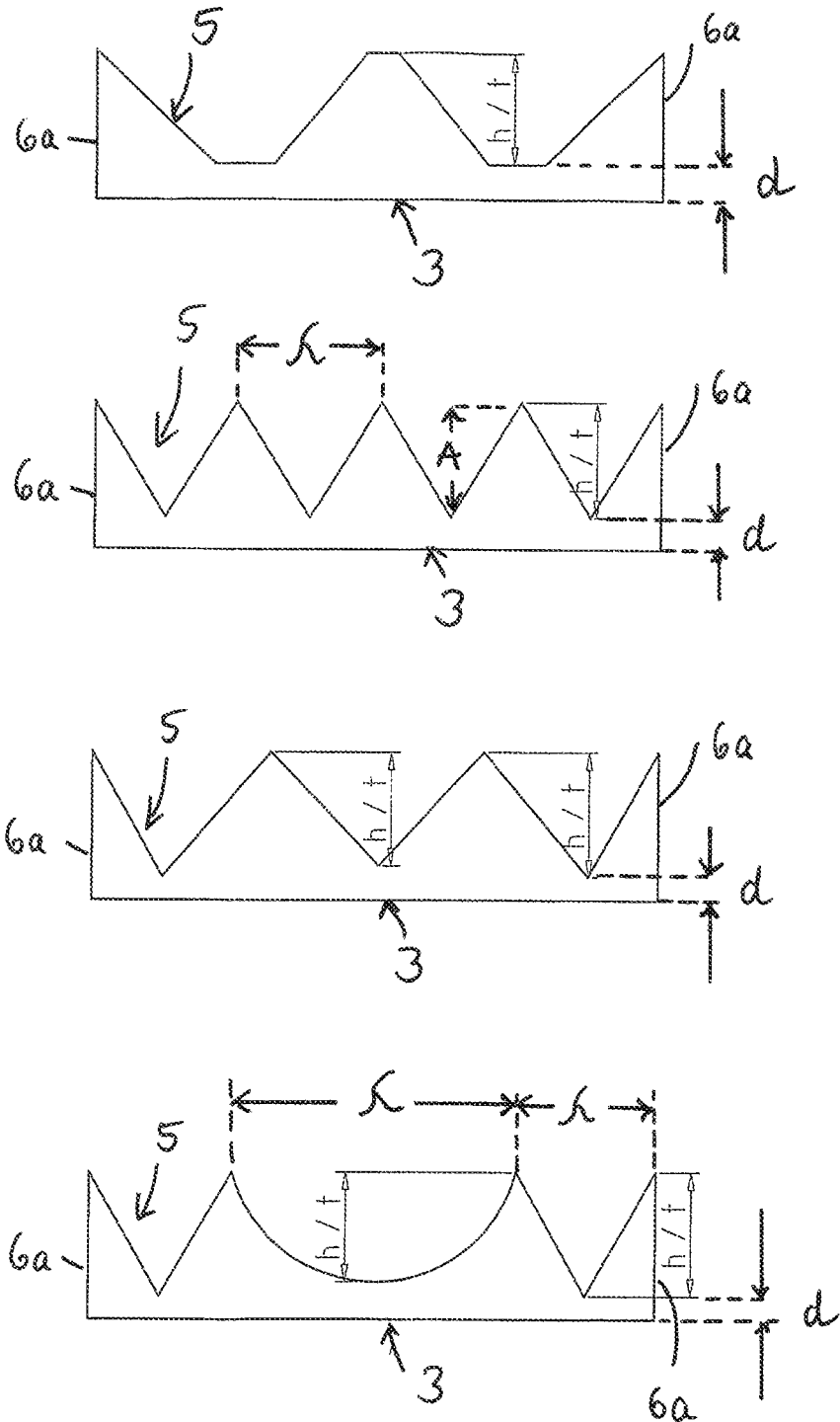
FIG. 15 shows in a non limiting manner cross sections and alignments through possible forms of baffles 10.

FIG. 15 shows in a non limiting manner cross sections and alignments through possible forms of baffles 10.

Figure 16:
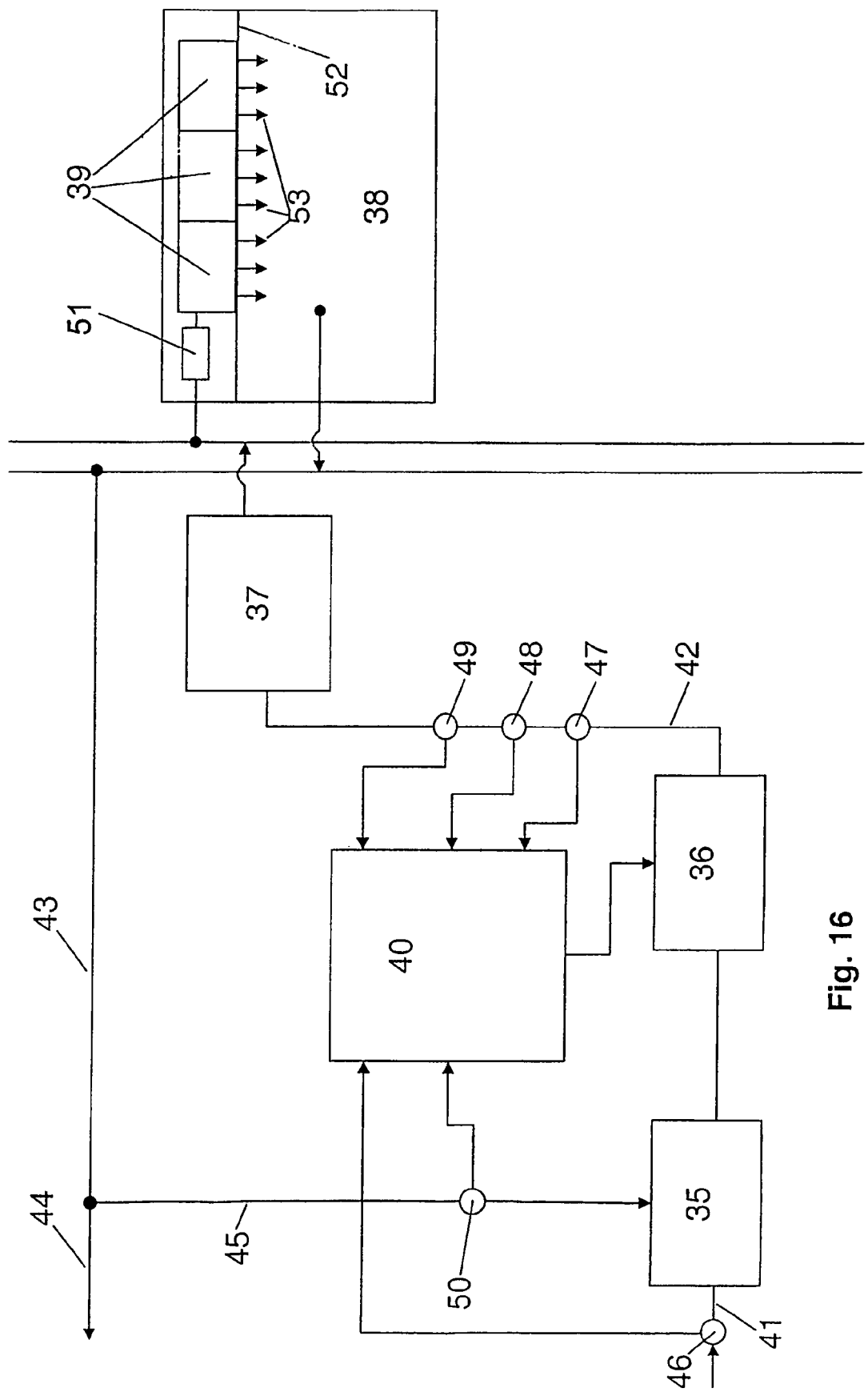
FIG. 16 shows purely schematically a possible scheme according to which, based on the actual situation, an ionization of the supply air may be guaranteed.

FIG. 16 shows purely schematically a possible scheme according to which, based on the actual situation, an ionization of the supply air may be guaranteed.

FIG. 17 shows purely schematically a possible manner of an alignment of a separately hung up foil 26 and of a light source 28.

An air conduct chamber 2 was prepared as follows:

For the preparation of the upper surface 5 of an air conduct chamber 2 was used a 0.75 mm thick electrolytically zinc-plated steel plate that had a length of 960 mm and a width of 577 mm.

In both front sides 6a was punched an opening 7 for the inlet of air and an opening 8 for the outlet of air. Both openings 7, 8 had a diameter of 83 mm.

On both longitudinal sides were mounted holes 20 that served for the fixation of the side walls 6b.

On both longitudinal sides and on both front sides 6a were mounted free press cuts 19 and edges 18 with an angle of 9Q0 downwards.

In a distance of 118 mm, 301 mm and 480 mm from the front side 6a with the opening 8 for the outlet of air and in a distance of 118 mm and 301 mm from the front side 6a with the opening 7 for the inlet of air were mounted at the respective locations edges with the angles $\alpha$, $\beta$, $\gamma$ and $\delta$ in an alternative way upwards and downwards.

The angle $\alpha$ had a value of 103°, and the angle t3 had a value of 102°. The angles $\gamma$ and $5$ had the same size and had each a value of 52°.

The so prepared upper surface 5 of the air conduct chamber 2 had two baffles 10 with each a triangular cross section. The height h of these two baffles 10 was 113 mm.

The length of the upper surface 5 of this air conduct chamber 2 was 590 mm, and the width of the upper surface 5 of this air conduct chamber 2 was 560 mm.

There were prepared two side walls 6b from a1 mm thick electrolytically zinc-plated steel plate. These side walls 6b had a length of 590 mm and a height of 112 mm and were edged along one longitudinal side for 10 mm for an angle of 90°. This edge served as a stopper for a bracket 30.

These side walls 6b had holes 21 that were adjusted to the holes 20 in the longitudinal side of the upper surface 5 of the air conduct chamber 2.

Both side walls 6b were connected with the upper surface 5 of the air conduct chamber 2 by means of rivets ("Popnieten") in an essentially hermetically way.

These side walls 6b serve also for the stabilization of the upper surface 5 of the air conduct chamber 2.

In the opening 7 for the inlet of air and in the opening 8 for the outlet of air was inserted each a connecting piece 9 in the form of a pipe.

Such a connecting piece 9 in the form of a pipe had an outer diameter of 83 mm and an inner diameter of 80 mm, a height of 28 mm and was on one side in a length of about 5 mm bended outwards in an angle of 30° so that was formed an outer angle of 150°.

Both connecting pieces 9 in the form of pipes were each welded on at four points and were sealed in a circulating manner with silicone, so that an essentially hermetically bond was formed.

It would also be possible to prepare an air conduct chamber 2 with an injection moulding process or with a cupping process.

An active ceiling area 3 with micro-holes 4 was prepared as follows:

There was used a 0.6 mm thick electrolytically zinc-plated steel plate that had a length of 663 mm and a width of 635 mm.

In a quadratic alignment were punched along the length and along the width in a distance of each 5 mm 117 micro-holes 4 having a diameter of each 1 mm.

In the same process step were mounted at one broadside holes 31, that served as pin hole for a surface treatment, for example a powder coating.

Then were mounted at the desired locations on both longitudinal sides as well as on both broadsides free press cuts 32.

Then was effected the discharge of the plate.

On both broadsides were mounted different sized embossments 23a, 23b. The small embossments 23a serve for the snap In into a ceiling grid profile 25, and the big embossments 23b serve as stopper.

Then were mounted the edges 33 for each an angle of 45° downwards.

In principle it would be sufficient to have on each side one edge 33 only. But it is preferred to mount on each side two edges 33, because two edges 33 result in a finally mounted flat element 1 in an optically better appearance. The distance between two edges 33 may be about 5 mm.

For a colouring the so prepared piece was subjected to a conventional powder coating.

Then was fixed on the in mounted form not visible side along the edges 33 the sealing material 34. Thereby a weather strip, especially made of self-adhesive cell-caoutchouc, may be used. Especially suitable are the fire-proof polyurethane foam strips "Stop-Fire" of the company Maag Technik AG in CH-8602 Dübendorf/Switzerland.

Inventive flat elements 1 may be hung up on a sealing and may be connected with each other in the following way to an inventive device for thermal adjustment of indoor air, especially for cooling of indoor air:

A column of flat elements 1a, 1b, 1c may comprise from two to eight, especially from two to six, preferably from four to six, flat elements 1a, 1b, 1c.

On a sealing substructure are mounted suspensory mountings. In these suspensory mountings are fixed in parallel manner to each other rail-shaped ceiling grid profiles 25, especially hung up in a flexible form.

Ceiling grid profiles 25 that have the cross section as shown in FIG. 12 are especially suitable for the purposes of the present invention.

It is preferred to use for the hanging of an air conduct chamber 2 two rail-shaped ceiling grid profiles 25 arranged in parallel manner to each other.

Then are engaged the brackets 30 as shown in FIGS. 11a to 11d into the two ceiling grid profiles 25.

It is preferred for the hanging of an air conduct chamber 2 on each of the two rail-shaped ceiling grid profiles 25 to engage two brackets 30.

Then a first air conduct chamber 2a is hung up at the mentioned four brackets 30.

All further air conduct chambers 2b, 2c are hung up analogously.

The so hung up air conduct chambers 2a, 2b, 2c may be connected with each other as follows:

The connecting piece 9 in the form of a pipe that is in the opening 7 for the inlet of air in the first air conduct chamber 2a is connected with a conduct in which supply air is fed.

The connecting piece 9 in the form of a pipe that is in the opening 8 for the outlet of air in the first air conduct chamber 2a is connected with the connecting piece 9 in the form of a pipe that is in the opening 7 for the inlet of air in the second air conduct chamber 2b by means of a muffle with a centric mounted stopper and with lip seals.

Suitable muffles for this purpose are available from the company Schmidlin AG in CH-8910 Affoltern am Albis/Switzerland.

All further air conduct chambers 2c,2d are connected in analogy to the connection of the first air conduct chamber 2a with the second air conduct chamber 2b.

The connecting piece 9 in the form of a pipe that is in the opening 8 for the outlet of air in the last air conduct chamber 2c of a column is caped with an end cap 24.

Thereby attention has to be paid on that all above mentioned connections are essentially hermetically sealed.

Then the respective required number of active ceiling areas 3 with micro-holes 4 is engaged into the two ceiling grid profiles 25 and is aligned so that an optically proper picture of gaps is formed.

Into such an inventive device is fed preferably ionized supply air. Ionized supply air is preferably prepared according to the process as described in DE 10007 523.

In FIG. 16 is shown a possible scheme according to which, based on the actual situation, an ionization of the supply air may be guaranteed. The in FIG. 16 the used reference numerals have the following meaning:
- 35 device for the air conditioning
- 36 device for the ionization of air
- 37 device for the thermal adjustment of the supply air
- 38 room to be thermally adjusted
- 39 inventive flat elements 1
- 40 device for the control of the ionization of the supply air, based on the actual situation
- 41 outdoor air conduct
- 42 supply air conduct
- 43 exhaust air conduct
- 44 discharged air conduct
- 45 circulating air conduct
- 46 air quality sensor
- 47 ozone sensor
- 48 air humidity sensor
- 49 air stream sensor
- 50 air quality sensor
- 51 controller for the supply air volume stream
- 52 separately hung up foil 26
- 53 laminar displacement air stream.

Due to the laminar displacement air stream obtained with the inventive device the user is located in the correspondingly air-conditioned room in a direct way in the correspondingly purified supply air stream.

A further advantage of the with the inventive device obtained laminar displacement air stream consists therein that on the outside, that is the visible side, of the active ceiling area 3 no particles may be deposited, and thus no essential contamination of the visible surface area may occur.

Also due to the laminar displacement air stream on the visible side of the active ceiling area 3 no water vapor may condense.

In the present invention the following reference numerals are used:
- 1 flat element
- 2 air conduct chamber
- 3 active ceiling area
- 4 micro-holes
- 5 upper surface
- 6a, 6b side walls
- 7 opening for the inlet of air
- 8 opening for the outlet of air
- 9 connecting piece in the form of a pipe
- 10 baffle
- 11 air conduct angle
- 12 lower part of the front side of a baffle
- 13 lower part of the back side of a baffle
- 14 upper part 15 upper part of the back side of a first back of the front side of a second baffle
- 16 upper part of the front side of a first baffle
- 17 upper part of the back side of the last baffle
- 18 edges
- 19 free press cuts
- 20, 21 holes
- 22 side walls
- 23 fixing parts and/or arrests
- 24 end cap
- 25 ceiling grid profile
- 26 foil
- 27 micro-holes in the foil 26
- 28 light source
- 29 frame
- 30 bracket
- 31 holes
- 32 free press cuts
- 33 edges
- 34 sealing material.

The invention claimed is:

1. A flat element (1) for thermal adjustment of indoor air in the form of a ceiling element or of a wall element, the flat element comprising:
    an air conduct device (2) comprising baffles (10) connected to each other and forming a closed upper surface (5), a first side wall with at least one opening (7) for inlet of air, a second side wall with at least one opening (8) for outlet of air, wherein the air conduct device (2) has a bottom side that is open, wherein the baffles (10) extend from the first side wall all the way to the second side wall;
    an active ceiling area (3) in the form of a sheet metal with micro-holes (4);
    wherein into each opening (7) for inlet of air and into each opening (8) for outlet of air a connecting pipe nozzle (9) is inserted and is essentially hermetically sealed;
    wherein the active ceiling area (3) terminates the air conduct device (2) at the bottom side and the air conduct device (2) and the active ceiling area (3) are essentially hermetically sealed with each other;
    wherein the baffles (10) when viewed in cross-section have a triangle wave shape, a multiangle wave shape or a sinuous wave shape,
    wherein the baffles (10) comprise a front side with a lower part (12) and a back side with a lower part (13), wherein the lower parts of the front side and of the back side are arranged angled to each other and are connected to each other to an edge forming an air conduct angle (11);
    wherein the front side and the back side are oriented such the air conduct angle points to the active ceiling area (3),
    wherein the baffles (10) generate turbulences in an air stream supplied through the at least one opening for inlet of air;
    wherein the first and second side walls (6a) and the edge forming the air conduct angle (10) are arranged parallel to each other.

2. The flat element according to claim 1, wherein the air conduct angle (11) of the baffles (10) are chamfered.

3. The flat element according to claim 1, wherein the baffles (10) independent from each other have the same or different wave lengths (λ) and the same or different amplitudes (A).

4. The flat element according to claim 1, wherein the baffles (10) have the same wave lengths (λ) and the same or different amplitudes (A).

5. The flat element according to claim 1, wherein the triangle-shaped baffles (10) independent from each other are aligned symmetrically or asymmetrically and have either the same or different heights h and downs t, respectively.

6. The flat element according to claim 1, wherein the baffles (10) are arranged symmetrically with the same or different heights h and downs t, respectively.

7. The flat element according to claim 1, wherein the baffles (10) have a length of 600 mm and wherein a distance (d) between the air conduct angle (11) of the baffles (10) and an inward side of the active ceiling area (3) is from 1 mm to 25 mm.

8. The flat element according to claim 7, wherein the distance (d) is adjustable.

9. The flat element according to claim 1, wherein the triangle shaped baffles (10) have:
an angle α between the lower part of the front side (12) and the lower part of the back side (13) that is from 72° to 134°,
an angle β between an upper part of the back side (14) of a first baffle (10) and an upper part of the front side (15) of a second baffle (10) is from 75° to 140°,
an angle γ between the first side wall and the upper part of the front side (16) of a first baffle (10) is from 38° to 72°,
an angle δ between the second side wall (6a) and the upper part of the back side (7) of the last baffle (10) is from 38° to 72°,
wherein the angle γ and the angle δ have the same value.

10. The flat element according to claim 9, wherein the first side wall, the second side wall and the baffles together are formed of a single piece, wherein the baffles have chamfered areas (18) extending between the first and the second side walls and provided with free press cuts (19) and holes (20), wherein the first side wall (6a) has a front side with an edge for stabilization, wherein the second side wall has a second front side with an edge for stabilization, wherein the connecting pipe nozzles (9) are essentially hermetically sealed relative to the first and second sidewalls, wherein two of the baffles having a triangular shape are arranged between the first and second side walls so that the upper surface has five edges alternatingly positioned at the bottom side or the active sealing area are provided with the angles α, β, γ and δ.

11. The flat element according to claim 1, wherein the air conduct device comprises two laterals sidewalls (6b) connected hermetically sealed to the upper surface and having holes (21).

12. The flat element according to claim 1, wherein the air conduct device (2) is made of metal or of a metal alloy.

13. The flat element according to claim 1, wherein the air conduct device (2) is made of aluminium, zinc plated steel plate, electrolytically zinc plated steel plate, rustless steel plate, copper or brass.

14. The flat element according to claim 1, wherein the micro-holes (4) in the active ceiling area (3) are round and have a diameter from about 0.50 mm to about 1.20 mm, and are present in a straight or staggered or regular or irregular in-line configuration.

15. The flat element according to claim 1 wherein the outward visible side of the active ceiling area (3) is left in an unprocessed state or that this side is surface-treated.

16. The flat element according to claim 15, wherein the outward visible side of the active ceiling area (3) is powder-coated.

17. The flat element according to claim 1, wherein the active ceiling area (3) has chamfered areas and wherein at least two chamfered areas (22) opposing each other comprise fixing parts and/or arrests (23).

18. The flat element according to claim 1, wherein a free cross-section in the active ceiling area (3) is from about 1% to about 4% in reference to the total area of the active ceiling area (3).

19. The flat element according to claim 1, wherein the air conduct device (2) and the active ceiling area (3) are hermetically sealed by a sealing material (34).

20. A device for thermal adjustment of indoor air, wherein the device comprises at least one column of flat elements (1a, 1b, 1c) according to claim 1 that are essentially hermetically sealed with each other.

21. The device according to claim 20, wherein
the connecting pipe nozzle (9) that is inserted in the opening (7) for inlet of air in a first air conduct device (2) is connected hermetically sealed with a conduct supplying air;
the connecting pipe nozzle (9) that is inserted in the opening (8) for outlet of air in the first air conduct device (2), is connected hermetically sealed with the connecting pipe nozzle (9) that is inserted in the opening (7) for the inlet of air in the second air conduct device (2),
all further air conduct devices (2) are connected hermetically sealed with each other in analogy to the connection of the first air conduct device (2) with the second air conduct device (2),
the connecting pipe nozzle (9) that is inserted in the opening (8) for outlet of air in the last air conduct device (2) of said column is closed hermetically sealed with an end cap (24).

22. The device according to claim 20, wherein the column of flat elements (1a, 1b, 1c) comprises from two to eight flat elements (1a, 1b, 1c).

23. The device according to claim 20, wherein each air conduct device (2) and each active ceiling area (3) is secured individually on at least two opposite rail-shaped ceiling grid profiles (25), whereby the ceiling grid profiles (25) are affixed on hanging supports in a ceiling substructure.

24. The device according to claim 20, wherein ionized supply air is feed in.

25. The device according to claim 21, wherein at least one light source is arranged between the outward visible sides of the active ceiling area (3) and a separately hung up foil (26).

* * * * *